(12) United States Patent
Hahn et al.

(10) Patent No.: US 8,505,592 B2
(45) Date of Patent: Aug. 13, 2013

(54) FUEL SPILL TRAY

(75) Inventors: Timothy A. Hahn, Woodstock, OH (US); Stephen G. Hlopick, Murrysville, PA (US)

(73) Assignee: Honda Motor Company, Ltd., Tokyo (JP)

( * ) Notice: Subject to any disclaimer, the term of this patent is extended or adjusted under 35 U.S.C. 154(b) by 575 days.

(21) Appl. No.: 12/885,649

(22) Filed: Sep. 20, 2010

(65) Prior Publication Data

US 2012/0067456 A1    Mar. 22, 2012

(51) Int. Cl.
*B65B 1/04*    (2006.01)
*B67D 7/32*    (2010.01)

(52) U.S. Cl.
CPC ................................. *B67D 7/3209* (2013.01)
USPC ............... 141/88; 141/86; 137/312; 296/38; 280/770

(58) Field of Classification Search
USPC .............. 141/86–88, 311 A, 350; 220/86.2; 296/97.22; 280/770; 137/312
See application file for complete search history.

(56) References Cited

U.S. PATENT DOCUMENTS

| | | | |
|---|---|---|---|
| 4,013,105 A | | 3/1977 | Uuskallio |
| 5,063,977 A | * | 11/1991 | Belland ............................ 141/86 |
| 5,094,315 A | * | 3/1992 | Taki et al. ...................... 180/219 |
| 5,184,751 A | * | 2/1993 | Middleton .................... 220/694 |
| 5,429,274 A | * | 7/1995 | Vlaskamp ...................... 222/108 |
| 5,785,099 A | * | 7/1998 | Kashani ............................ 141/86 |
| 5,857,503 A | * | 1/1999 | Vreeken ......................... 141/332 |
| 6,033,006 A | * | 3/2000 | Bovellan et al. ............ 296/97.22 |
| 6,286,593 B1 | * | 9/2001 | Holtby ........................... 166/81.1 |
| 6,289,946 B1 | * | 9/2001 | Davies ............................. 141/86 |
| 6,354,340 B1 | * | 3/2002 | Craine et al. ..................... 141/86 |
| 6,463,966 B1 | | 10/2002 | Goodger |
| 6,619,337 B1 | * | 9/2003 | Vickers ........................... 141/98 |
| 6,698,468 B1 | | 3/2004 | Thompson |
| 6,988,640 B2 | * | 1/2006 | Backe ........................... 222/109 |
| 8,162,168 B1 | * | 4/2012 | Patulak ......................... 220/562 |
| 2008/0179151 A1 | | 7/2008 | Chisuwa |
| 2010/0242925 A1 | * | 9/2010 | Yoshida et al. ............... 123/519 |

FOREIGN PATENT DOCUMENTS

| EP | 2022710 A2 | 2/2009 |
|---|---|---|
| EP | 2030883 A1 | 3/2009 |

* cited by examiner

*Primary Examiner* — Timothy L Maust
(74) *Attorney, Agent, or Firm* — Ulmer & Berne, LLP

(57) ABSTRACT

A fuel spill tray according to one embodiment includes a body and an arm extending outwardly away from the body. The body defines an annular channel and a generally central aperture configured to receive a neck of a fuel tank. The arm includes a proximal end integral with the body. The arm also includes a distal end, a first flange, a second flange laterally spaced from the first flange, and a first web integral with each of the first and second flanges. The arm also includes a first upper seal integral with the first flange and a second upper seal laterally spaced from the first upper seal and integral with the first flange. Each of the first and second flanges, the first web and the first and second upper seals extends longitudinally from the proximal end to the distal end of the arm. Vehicles are also provided.

25 Claims, 6 Drawing Sheets

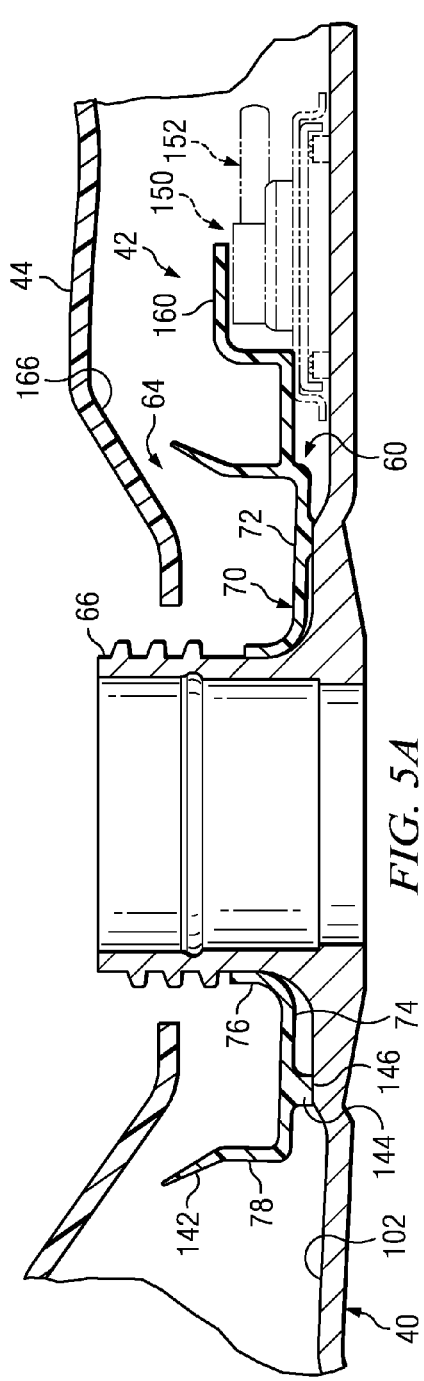
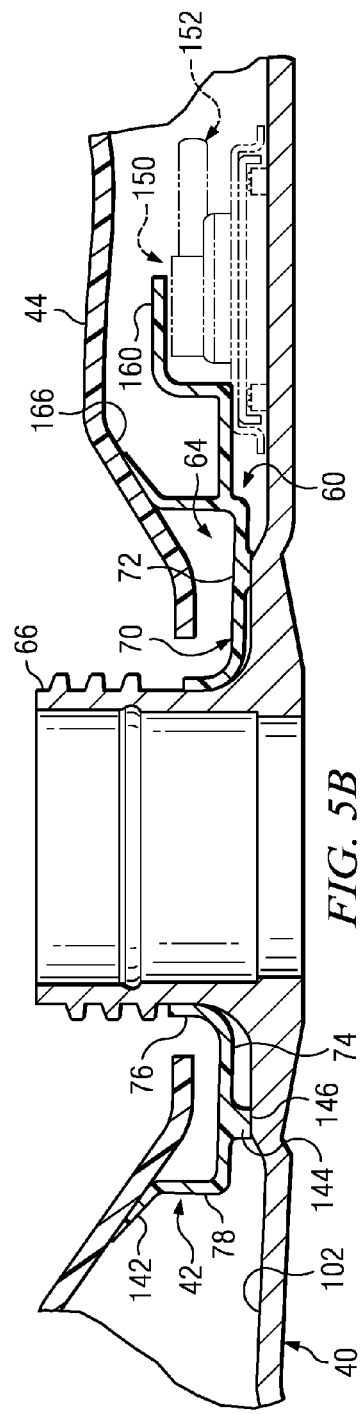
FIG. 5A
FIG. 5B

FUEL SPILL TRAY

TECHNICAL FIELD

A fuel spill tray for a vehicle is provided.

BACKGROUND

Some conventional all terrain vehicles (ATVs) include a fuel spill tray positioned between a fuel tank and a fuel tank cover. The fuel spill tray functions to prevent spilled fuel, for example from the fill cap of the fuel tank, from entering either an engine compartment or an exhaust area of the ATV. The ATV further includes foam strips glued with an adhesive to the fuel tank or fuel tank cover, and positioned in an open air space between the fuel tank and the fuel tank cover. The purpose of the foam strips is to prevent debris from entering an adjacent air intake system. However, over time the adhesive and foam can deteriorate, and the deterioration can be accelerated due to contact with spilled fuel. In some instances, the degradation of these foam strips eventually results in debris entering the air intake system and shortening the life of an engine of the ATV.

SUMMARY

According to one embodiment, a fuel spill tray includes a body defining a generally central aperture and an annular channel. The generally central aperture is configured to receive a neck of a fuel tank. The fuel spill tray further includes a first arm extending outwardly away from the body. The first arm includes a proximal end integral with the body. The first arm also includes a distal end, a first flange, a second flange laterally spaced from the first flange, and a first web integral with each of the first and second flanges. Each of the first and second flanges and the first web extend longitudinally from the proximal end to the distal end of the first arm. The first arm further includes a first upper seal integral with the first flange and a second upper seal laterally spaced from the first upper seal and integral with the second flange. Each of the first upper seal and the second upper seal extends longitudinally from the proximal end to the distal end of the first arm.

According to another embodiment, a vehicle includes a frame and a fuel tank supported by the frame. The fuel tank includes an outer surface and a neck extending away from the outer surface. The vehicle also includes a fuel spill tray, and a fuel tank cover that is supported by the frame and has a lower surface. The fuel spill tray is interposed between the fuel tank and the fuel tank cover and is in contacting engagement with each of the outer surface of the fuel tank and the lower surface of the fuel tank cover. The fuel spill tray includes a body defining a generally central aperture and an annular channel. The generally central aperture receives the neck of the fuel tank. The fuel spill tray also includes a first arm extending outwardly away from the body. The first arm has a proximal end integral with the body and a distal end. The first arm also includes a first flange, a second flange laterally spaced from the first flange, and a first web integral with each of the first and second flanges. Each of the first and second flanges and the first web extends longitudinally from the proximal end to the distal end of the first arm. The first arm further includes a first upper seal integral with the first flange and a second upper seal laterally spaced from the first upper seal and integral with the second flange. Each of the first upper seal and the second upper seal extends longitudinally from the proximal end to the distal end of the first arm and is in contacting engagement with the lower surface of the fuel tank cover.

According to another embodiment, a vehicle includes a frame, a fuel tank supported by the frame, and a fuel tank cover supported by the frame. The vehicle also includes a fuel spill tray interposed between the fuel tank and the fuel tank cover. The fuel spill tray is in contacting engagement with each of the fuel tank and the fuel tank cover. The vehicle also includes an air intake system that includes a snorkel. The snorkel is rearward of the fuel tank. The fuel spill tray includes a body and a first arm extending outwardly away from the body. The first arm includes at least one upper seal engaging the fuel tank coyer.

BRIEF DESCRIPTION OF THE DRAWINGS

Various embodiments will become better understood with regard to the following description, appended claims and accompanying drawings wherein:

FIG. 5A is a cross-sectional view of the fuel spill tray of FIG. 4, taken along line 5-5 in FIG. 4 and in association with the fuel tank and the fuel tank cover, with an upper annular seal of a body of the fuel spill tray shown in FIGS. 2-4 depicted as spaced apart from the fuel tank cover, for purposes of illustration, such that the upper annular seal is in a non-compressed condition;

FIG. 5B is a cross-sectional view similar to FIG. 5A, but with the fuel tank cover and fuel spill tray being depicted in an assembled condition such that the upper annular seal is in contacting engagement with the fuel tank cover and is in a compressed, deflected condition;

DETAILED DESCRIPTION

Figure 1:
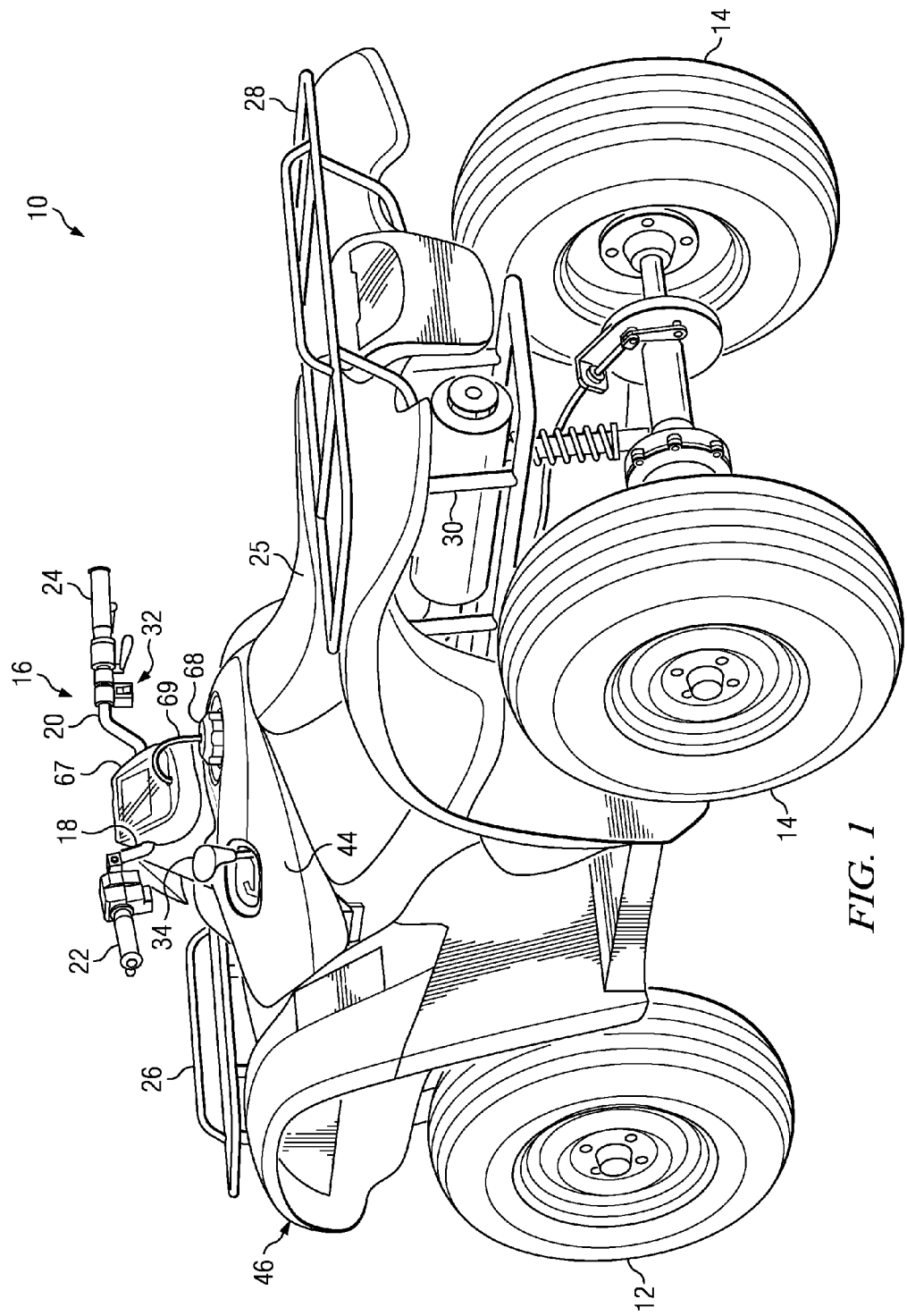
FIG. 1 is a perspective view of a vehicle.

Certain embodiments are herein described in connection with the views and examples of FIGS. 1-7 wherein like numbers indicate the same or corresponding elements throughout the views. FIG. 1 illustrates a vehicle 10 which is shown to be an all terrain vehicle. However, a vehicle in accordance with alternative embodiments can be an automobile, a truck, a van, a recreational vehicle, a utility vehicle, agricultural equipment, construction equipment, or a mower, for example.

The vehicle 10 can include a pair of front wheels 12 (one shown) and a pair of rear wheels 14. The front wheels 12 can comprise steerable wheels. A handlebar assembly 16 can be operably coupled with the front wheels 12 to facilitate steering of the front wheels 12. The handlebar assembly 16 can include left and right handlebars 18, 20, a left hand grip 22 secured to the left handlebar 18, and a right hand grip 24 secured to the right handlebar 20. Vehicle 10 can include a straddle-type seat 25, which can be supported by a frame (e.g., 30). The straddle-type seat 25 can be configured to support an operator of vehicle 10 and can be positioned such that an operator of vehicle 10 seated upon the straddle-type seat 25 can easily grasp the left and fight hand grips 22, 24. The vehicle 10 can also include front and rear cargo racks 26, 28 that can be respectively supported at the front and rear of the vehicle 10 by the frame 30. The front and rear cargo racks 26, 28 can facilitate support of cargo for transportation by the vehicle 10.

Vehicle 10 can include an engine (not shown), which can be an internal combustion engine. Vehicle 10 can also include a transmission (not shown) that can be a hydraulic-type transmission, a hydrostatic-type transmission, a belt-driven transmission, or any of a variety of other suitable transmission arrangements. In one embodiment, the transmission can be an automated manual transmission ("AMT") that can be shifted between operating modes by transmission switch 32 (FIG. 1). The transmission switch 32 can be movable between an upshift position and a downshift position, and a user can selectively actuate the transmission switch 32 to select from among a variety of operating ranges. In one embodiment, vehicle 10 can be configured to operate in either a two-wheel drive (2WD) mode or a four-wheel drive (4WD) mode. When configured for either 2WD or 4WD operation, vehicle 10 can include a 2WD/4WD lever 34 (FIG. 1) that can be movable between a 2WD position and a 4WD position. The lever 34 can be provided adjacent to the handlebar assembly 16, within easy reach of an operator seated upon seat 25.

The transmission can include an input and an output. The input and output of the transmission can be associated with each other such that operation of the input facilitates operation of the output. As is common, the transmission can be coupled with the engine and can operate in a variety of modes such that the engine can drive the wheels 12, 14 at a variety of different speeds and torques, and in different directions.

Figure 2:
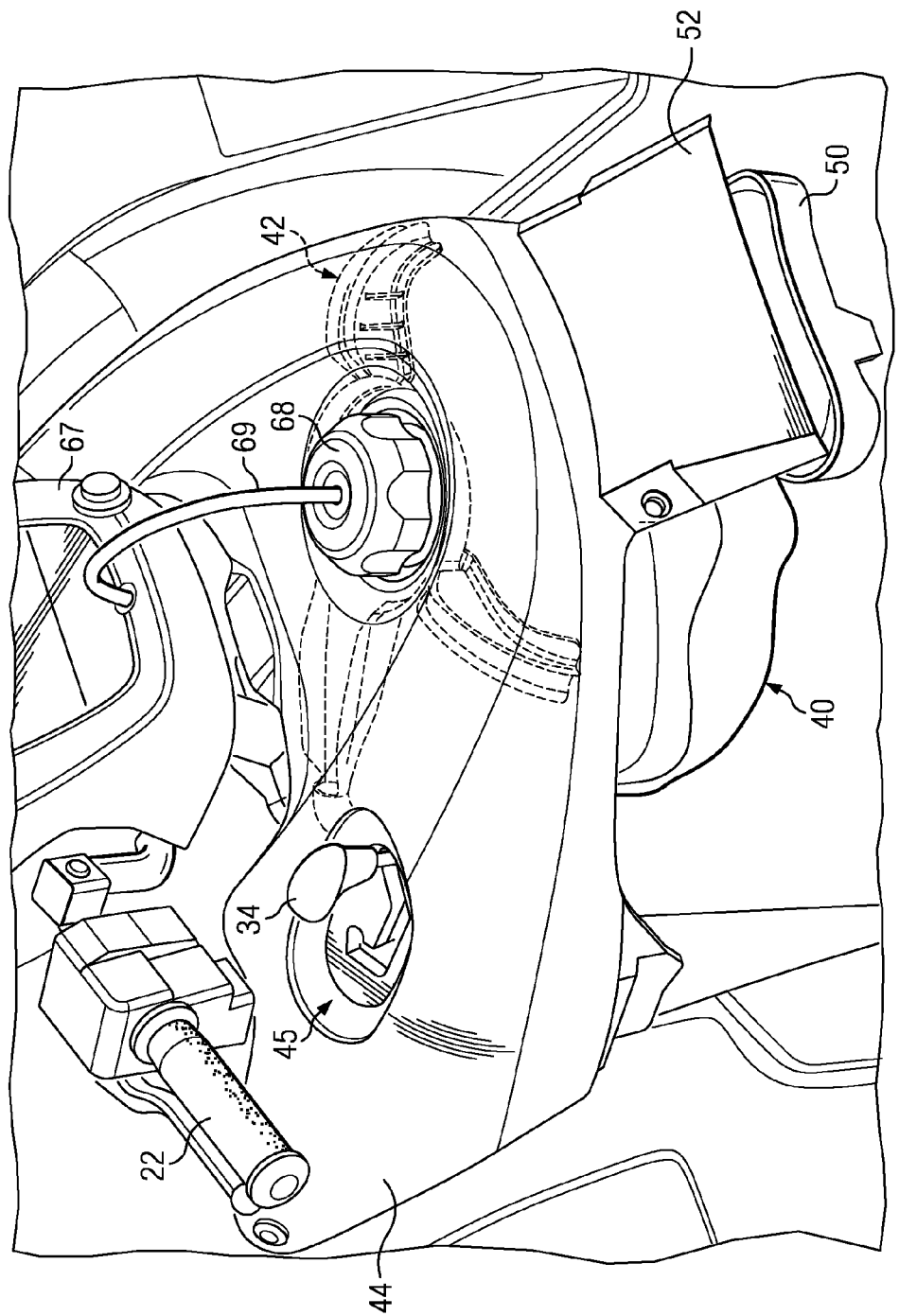
FIG. 2 is a perspective view of a portion of the vehicle shown in FIG. 1, with various portions of a body of the vehicle omitted for purposes of illustration, and depicting a fuel tank, a fuel tank cover and a fuel spill tray according to one embodiment, portions of which are shown in dashed lines.

Vehicle 10 can include a fuel system that can include a fuel tank 40 (FIG. 2) that can be in fluid communication with the engine of vehicle 10. Vehicle 10 can also include a fuel spill tray 42 according to one embodiment, which can be interposed between the fuel tank 40 and a fuel tank cover 44. Each of the fuel tank 40 and the fuel tank cover 44 can be attached, either directly or indirectly, to the frame 30 such that each of the fuel tank 40 and the fuel tank cover 44 can be supported by the frame 30. The fuel tank cover 44 can define an aperture 45 (FIG. 2) that can receive the 2WD/4WD lever 34. As shown in FIGS. 1-2, at least a portion of the fuel tank cover 44 can provide a visible panel of a body 46 of vehicle 10. The fuel tank cover 44 can include a suitable surface finish and can be configured to complement the shapes of adjacent body panels, such that the fuel tank cover 44 enhances the aesthetic appeal of vehicle 10.

Figure 3:
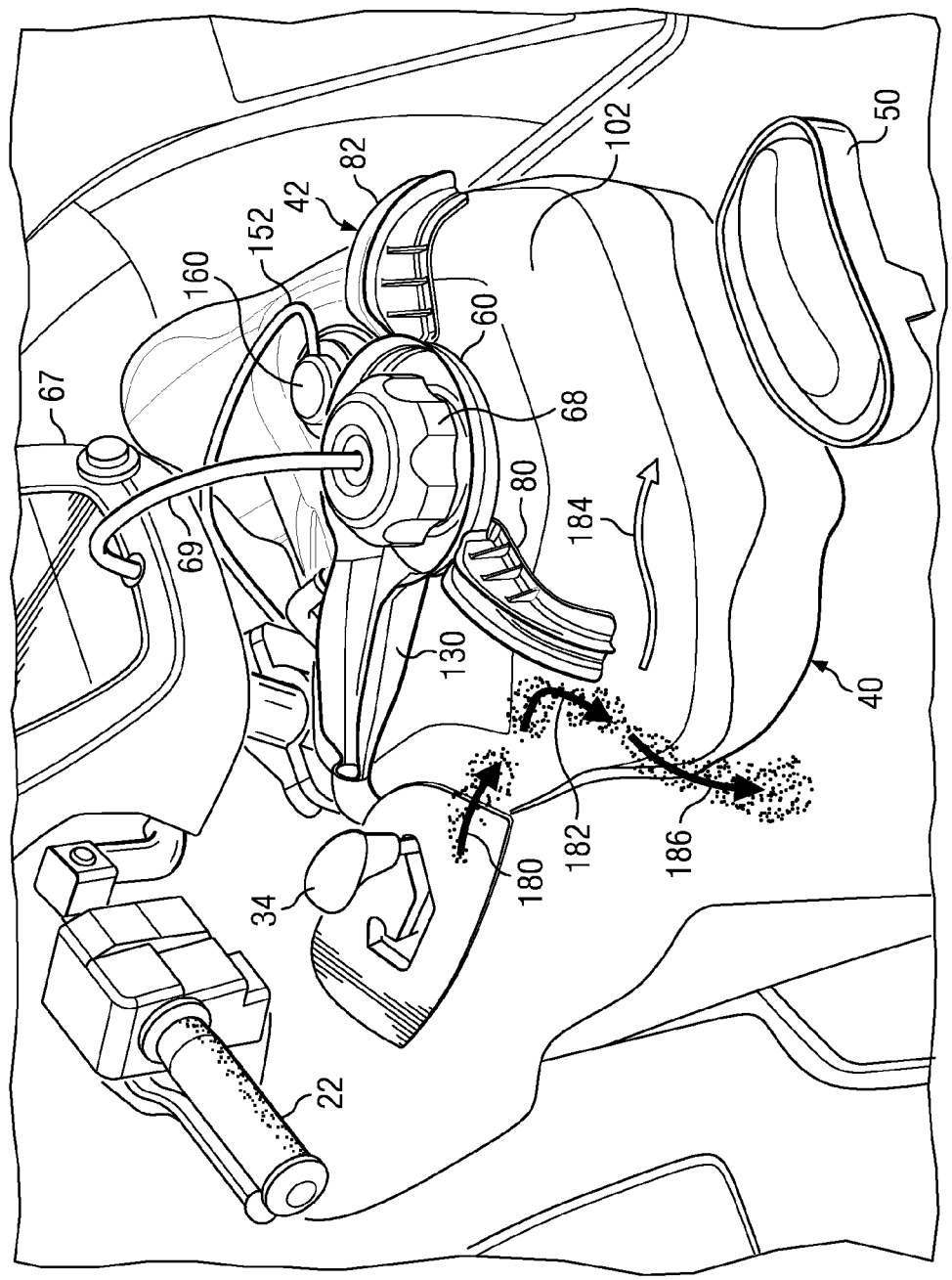
FIG. 3 is a perspective view similar to FIG. 2, but with the fuel cover not shown and the fuel spill tray depicted in solid lines.

The engine of vehicle 10 can include an air intake port (not shown) for receiving air, and perhaps also fuel, for consumption by the engine. An air intake system can be attached to the air intake port. The air intake system can be configured to present a charge of air (and fuel, depending on the engine configuration) to the air intake port for consumption by the engine. The air intake system can include a snorkel 50 (FIGS. 2-3) that can be configured to capture ambient air to be supplied to the air intake port of the engine. As shown in FIGS. 2 and 3, the snorkel 50 can be positioned adjacent to, and rearward of, the fuel tank 40. The fuel tank cover 44 can include an air scoop 52 that can facilitate directing air to the snorkel 50. The fuel spill tray 42 can function to prevent spilled fuel from entering an engine compartment and exhaust area, for example fuel spilled while filling the fuel tank 40, and can also function to prevent, or substantially prevent, debris from entering the snorkel 50.

Referring to FIGS. 3-7, the fuel spill tray 42 can include a body 60 that can define a generally central aperture 62 and that can also define an annular channel 64. The generally central aperture 62 can be configured to receive, a neck 66 of the fuel tank 40. As shown in FIGS. 5A and 5B, the neck 66 can extend through the generally central aperture 62 and above body 60. A cap 68 (FIGS. 2 and 3) can be secured to an upper end of the neck 66. In one embodiment, each of the cap 68 and the upper end of the neck 66 of fuel tank 40 can include threads, which can mate with one another, such that the cap 68 can be threaded onto the upper end of the neck 66. As shown in FIGS. 1-3, a vent tube 69 can be inserted through the cap 68 into an interior of the fuel tank 40 and can be connected, at an opposite end, to a fitting (hot shown) on a console 67 of the vehicle 10, which can be vented to atmosphere. It will be appreciated that a vent tube can be attached at other locations which are vented to atmosphere.

The body 60 of fuel spill tray 42 can include a disk 70, which can have an upper surface 72 and a lower surface 74. The body 60 can also include an upper, inner annular flange 76 and an upper, outer annular flange 78. As shown in FIGS. 5A and 5B, each of the upper, inner annular flange 76 and the upper, outer annular flange 78 can extend above the upper surface 72 of the disk 70. The upper, inner annular flange 76 can define the generally central aperture 62. The upper, inner annular flange 76, the upper, outer annular flange 78, and the upper surface 72 of disk 70 can cooperate to define the annular channel 64. In one embodiment, the generally central aperture 62 can be sized such that the upper, inner annular flange 76 engages the neck 66 of fuel tank 40, as shown in FIGS. 5A and 5B. In one embodiment, the upper, inner annular flange 76 can engage neck 66 of fuel tank 40 in an interference fit.

Figure 4:
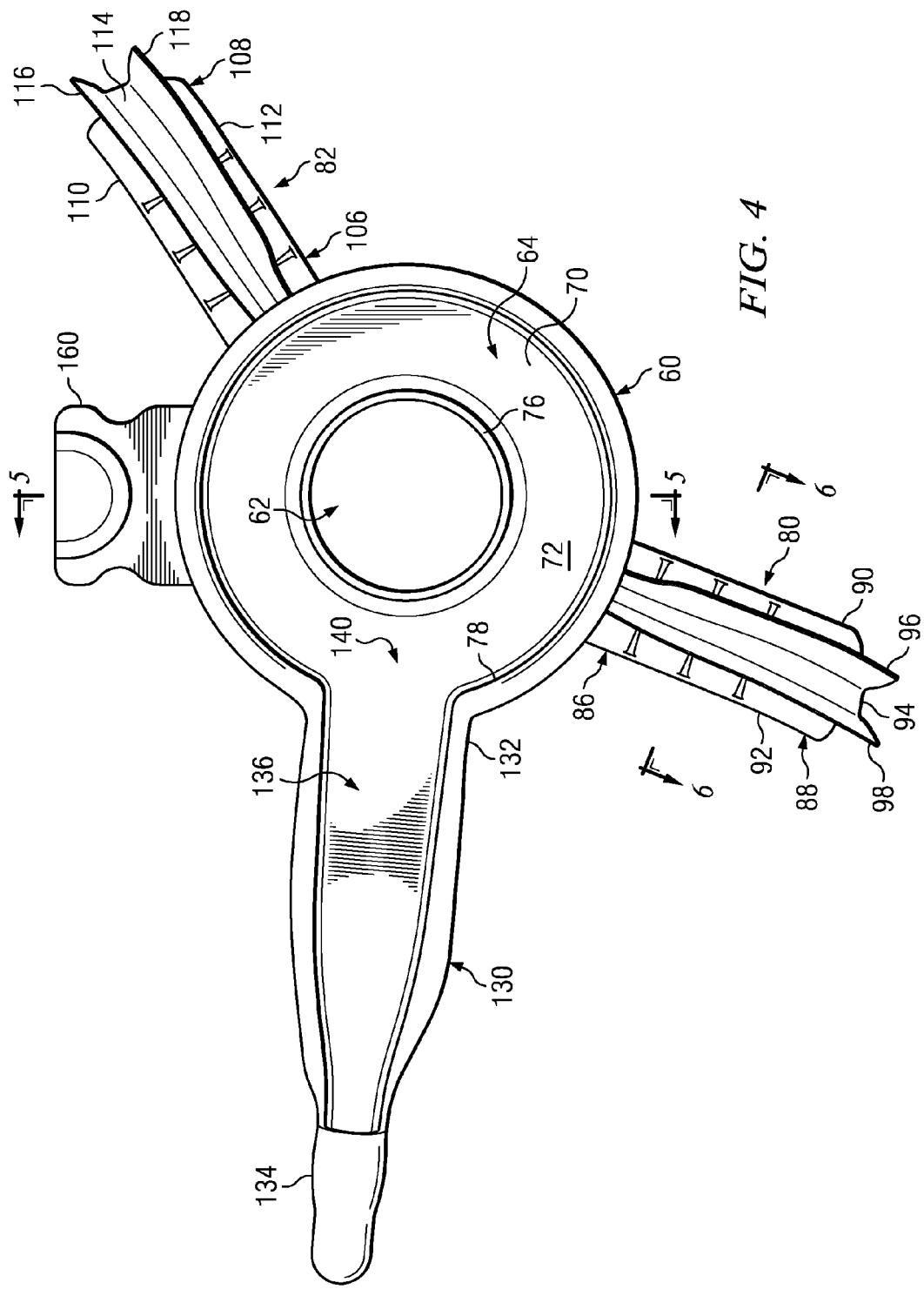
FIG. 4 is a top plan view of the fuel spill tray shown in FIGS. 2 and 3.

Referring to FIG. 4, the fuel spill tray 42 can also include a first arm 80 and a second arm 82, which can each extend outwardly away from the body 60 of the fuel spill tray 42. In one embodiment, each of the first arm 80 and the second arm 82 can be fluidicly uncoupled from the annular channel 64, i.e., not in fluid communication with the annular channel 64, as shown in FIG. 4. The first arm 80 can include a proximal end 86 and a distal end 88. The proximal end 86 can be integral with the body 60. The first arm 80 can include a first flange 90, a second flange 92 laterally spaced from the first flange 90, and a first web 94 integral with each of the first and second flanges 90, 92, and extending between the first and second flanges 90, 92. Each of the first flange 90, the second flange 92, and the first web 94 can extend longitudinally from the proximal end 86 to the distal end 88 of the first arm 80.

The first arm 80 of the fuel spill tray 42 can include a first upper seal 96, which can be integral with the first flange 90, and can include a second upper seal 98, which can be laterally spaced from the first upper seal 96 and which can be integral with the second flange 92. Each of the first upper seal 96 and the second upper seal 98 can extend longitudinally from the proximal end 86 to the distal end 88 of the first arm 80.

Figure 6A:
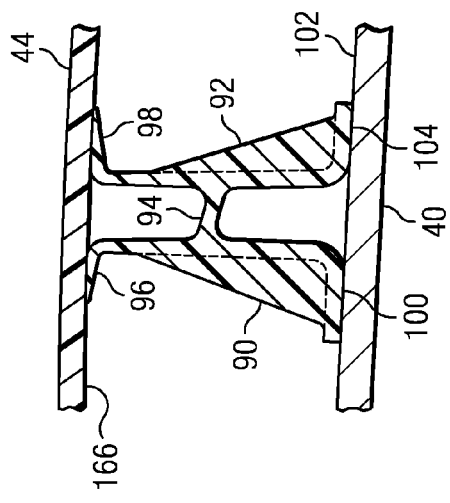
FIG. 6A is a cross-sectional view taken along line 6-6 in FIG. 4, with the two upper seals being depicted in a non-compressed condition.
Figure 6B:
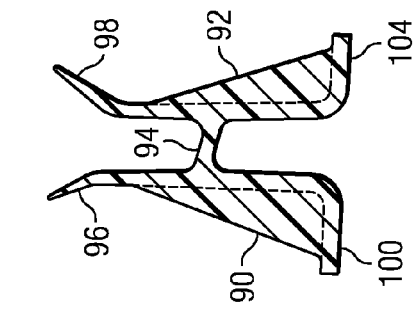
FIG. 6B is a cross-sectional view similar to FIG. 6A, but also depicting a portion of each of the fuel tank and the fuel tray cover shown in FIGS. 1 and 2, and with the two upper seals shown in contacting engagement with the fuel tray cover such that the two upper seals are in a compressed, deflected condition.

Referring to FIGS. 3, 6A and 6B, the first flange 90 of the first arm 80 can have a first lower surface 100 that can be contoured to complement a shape of an outer surface 102 of fuel tank 40, such that the lower surface 100 can be at least substantially entirely, i.e., substantially entirely or entirely, in contacting engagement with the outer surface 102 of fuel tank 40 from the proximal end 86 of the first arm 80 to the distal end 88 of the first arm 80, as shown in FIG. 3. A portion of the lower surface 100 can be generally linear and another portion of the lower surface 100 can be arcuate, as shown in FIG. 3.

The second flange 92 of the first arm 80 can have a second lower surface 104 (FIGS. 6A and 6B) that can be contoured to complement the shape of the outer surface 102 of fuel tank 40, such that the lower surface 104 can be at least substantially entirely, i.e., substantially entirely or entirely, in contacting engagement with the outer surface 102 of the fuel tank 40 from the proximal end 86 of the first arm 80 to the distal end 88 of the first arm 80. A portion of the lower surface 104 can be generally linear and another portion of the lower surface 104 can be arcuate.

Referring again to FIG. 4, the second arm 82 of the fuel spill tray 42 can include a proximal end 106 and a distal end 108. The proximal end 106 can be integral with the body 60. The second arm 82 can include a third flange 110, a fourth flange 112 laterally spaced from the third flange 110, and a second web 114 integral with each of the third and fourth flanges 110, 112, and extending between the third and fourth flanges 110, 112. Each of the third flange 110, the fourth flange 112, and the second web 114 can extend longitudinally from the proximal end 106 of the second arm 82 to the distal end 108 of the second arm 82.

The second arm 82 of the fuel spill tray 42 can include a third upper seal 116, which can be integral with the third flange 110, and can include a fourth upper seal 118, which can be laterally spaced from the third upper seal 116 and which can be integral with the fourth flange 112. Each of the third upper seal 116 and the fourth upper seal 118 can extend longitudinally from the proximal end 106 of the second arm 82 to the distal end 108 of the second arm 82.

Figure 7:
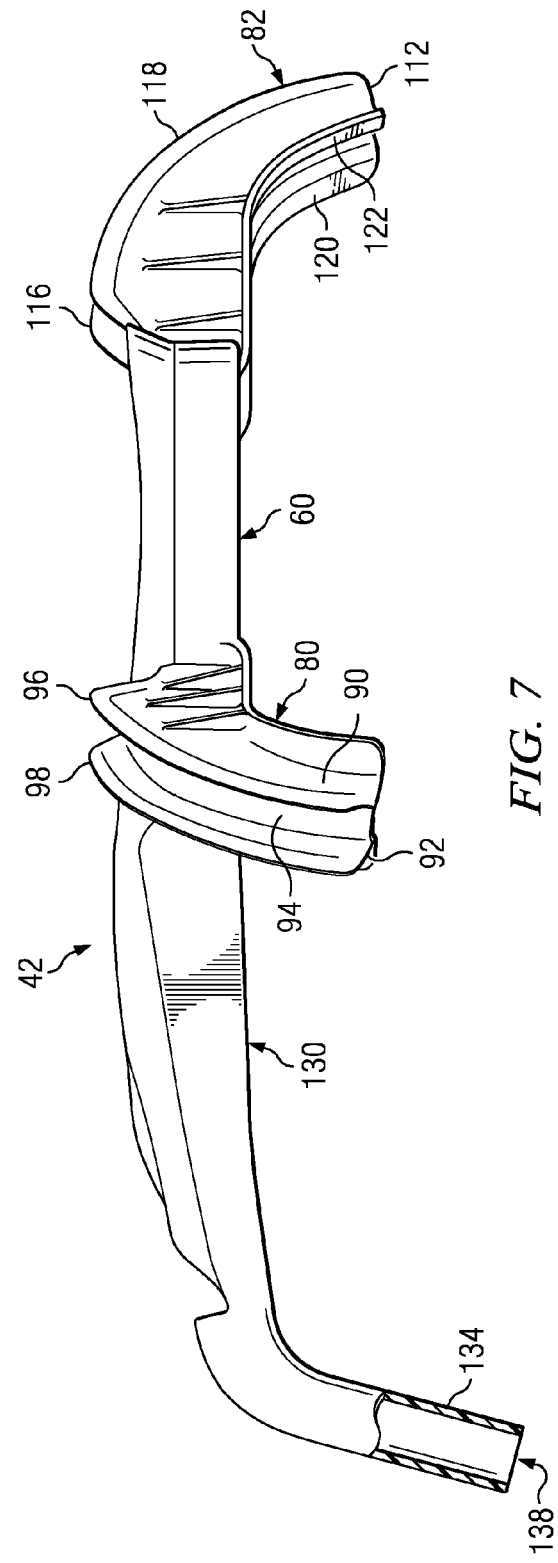
FIG. 7 is a perspective view of the fuel spill tray shown in FIGS. 2-6B.

The third flange 110 of the second arm 82 can have a third lower surface 120 (FIG. 7) that can be contoured to complement the shape of the outer surface 102 of fuel tank 40, such that the lower surface 120 can be at least substantially entirely, i.e., substantially entirely or entirely, in contacting engagement with the outer surface 102 of fuel tank 40 from the proximal end 106 of the second arm 82 to the distal end 108 of the second arm 82. A portion of the lower surface 120 can be generally linear and another portion of the lower surface 120 can be arcuate, as generally shown in FIG. 7.

The fourth flange 112 of the second arm 82 can have a fourth lower surface 122 that can be contoured to complement the shape of the outer surface 102 of fuel tank 40, such that the lower surface 122 can be at least substantially entirely, i.e., substantially entirely or entirely, in contacting engagement with the outer surface 102 of fuel tank 40 from the proximal end 106 of the second arm 82 to the distal end 108 of the second arm 82. A portion of the lower surface 122 can be generally linear and another portion of the lower surface 122 can be arcuate as shown in FIGS. 3 and 7.

The fuel spill tray 42 can include a spout 130, which can extend outwardly away from the body 60 of fuel spill tray 42. The spout 130 can include a proximal end 132 and a distal end 134, as shown in FIG. 4. The proximal end 132 can be integral with the body 60. The spout 130 can define a passage 136 (FIG. 4), and the distal end 134 of spout 130 can define an outlet opening 138 (FIG. 7) in fluid communication with the passage 136. The upper, outer annular flange 78 of body 60 can extend circumferentially less than 360°, as shown in FIG. 4, to define an inlet opening 140, which can be in fluid communication with each of the annular channel 64 and the passage 136. Accordingly, each of the passage 136 and the outlet opening 138 can be in fluid communication, indirectly, with the annular channel 64. A conduit (not shown) can be coupled to the distal end 134 of the spout 130 and can be routed to direct any spilled fuel away from an engine compartment and exhaust area to a desired location.

The body 60 of the fuel spill tray 42 can include an upper annular seal 142, which can extend circumferentially less than 360° (FIGS. 5A and 5B) and which can be integral with the upper, outer annular flange 78. The body 60 can include a lower annular flange 144 (FIGS. 5A and 5B) that can be integral with, and extend away from, the lower surface 74 of disk 70 of body 60. A lower surface 146 of the lower annular flange 144 can be in contacting engagement with the outer surface 102 of fuel tank 40.

Referring to FIGS. 5A and 5B, vehicle 10 can include a fuel sender 150 that can be attached to the fuel tank 40, and that can operably transmit an electronic signal to a fuel gauge to provide an indication of a level of fuel within the tank 40. The fuel sender 150 can be configured such that an analog or digital electronic signal can be generated in response to a position of a float device within fuel tank 40, with the electronic signal being operatively transmitted through a cable 152 to a fuel gauge (not shown). The fuel spill tray 42 can further include a fuel sender cover 160 (FIGS. 3, 5A and 5B) that can be integral with the body 60 of the fuel spin tray 42. The fuel sender cover 160 can be configured to engage the fuel sender 150, which can position the fuel spill tray 42 relative to the fuel tank 40. The fuel sender cover 160 can define an opening (not shown) through which the cable 152 can be routed. Cable 152 can cooperate with the fuel sender cover 160 to limit the angular orientation of the fuel spill tray 42 relative to the fuel tank 40.

The fuel spill tray 42 can be formed from a compound material, and can be formed using a molding process. In one embodiment, the fuel spill tray 42 can be formed using an injection molding process. In one embodiment, the fuel spill tray 42 can be formed from a compound material that includes polyvinyl chloride and nitrile butadiene rubber. However, in other embodiments, any suitable fuel resistant natural or synthetic rubber can be used, as well as any suitable thermoplastic material. The composition of the compound material of fuel spill tray 42 can provide some flexibility which can enhance the sealing ability of the fuel spill tray 42. For example, the fuel spill tray 42 can be configured and sized such that, when the fuel spill tray 42 is interposed between the fuel tank 40 and the fuel tank cover 44, each of the first upper seal 96, the second upper seal 98, the third upper seal 116, the fourth upper seal 118, and the upper annular seal 142 can engage a lower surface 166 (FIGS. 5B and 6B) of the fuel tank cover 44 in an interference fit. In one embodiment, each of the seals 96, 98, 116, 118 and 142 can be compressed, or deflected by about 3 mm-4 mm, to provide a sealing interface. However, it will be appreciated that the fuel spill tray 42 can be sized to provide other magnitudes of seal deflections to provide sealing interfaces between the respective seals 96, 98, 116, 118 and 142 and the lower surface 166 of the fuel tank cover 44.

The contacting engagement of various lower surfaces of the fuel spill tray 42 with the outer surface 102 of fuel tank 40 and the sealing engagement of each of the first and second upper seals 96, 98 of the first arm 80, the third and fourth upper seals 116, 118 of the second arm 82, and the upper annular seal 142 of body 60, of the fuel spill tray 42, with the fuel tank cover 44 can prevent debris from entering snorkel 50, or minimize the amount of debris entering snorkel 50, during the operation of vehicle 10. For example, air can flow in a generally forward-to-rearward direction, indicated generally by arrow 180 in FIG. 3, in the air space between the fuel tank 40 and the fuel tank cover 44 (not shown in FIG. 3), during operation of vehicle 10. In some instances, debris and/or snow can also flow in direction 180 with the air. This flow of air, debris and snow can impact the first arm 80 and can be redirected downward toward a surface upon which vehicle 10 is traveling, as indicated generally by arrow 182. The air, debris and snow can be redirected due to the engagement of the first and second upper seals 96, 98 of the first arm 80 with the lower surface 166 of the fuel tank cover 44 and the contacting engagement of the lower surfaces 100, 104 of the first flange 90 and the second flange 92, respectively, of the first arm 80 with the outer surface 102 of fuel tank 40. The relatively lighter air can then flow around the distal end 88 of the first arm 80 and toward the snorkel 50, as indicated generally by arrow 184. The relatively heavier debris and/or snow can continue to flow downward away from snorkel 50, under the action of gravity, as indicated generally by arrow 186. The second arm 82 can function in a similar manner to the first arm 80 with respect to redirecting debris and/or snow downward away from snorkel 50. The upper, outer annular flange 78 of the body 60 of fuel spill tray 42 can also facilitate preventing or minimizing debris and/or snow from entering snorkel 50. Preventing of minimizing debris and/or snow from entering snorkel 50 can lengthen the life of the engine of vehicle 10 relative to the engines of some conventional vehicles, which use foam strips positioned between a fuel tank and a fuel tank cover to prevent debris from entering the respective air intake system. The fuel resistant material of the fuel spill tray 42 can prevent, or at least minimize, degradation of the fuel spill tray 42. The body 60 and spout 130 can cooperate to route spilled fuel away from the engine compartment and exhaust area to a desired location.

While various embodiments of a fuel spill tray and a vehicle have been illustrated by the foregoing description and have been described in considerable detail, it is not intended to restrict or in any way limit the scope of the appended claims to such detail. Additional modifications will be readily apparent to those skilled in the art. For example, while the first arm 80 and the second arm 82 have each been depicted with two upper seals, it will be appreciated that fuel spill trays can be provided with a pair of arms, with either one or both of the arms including less than, or more than, two upper seals sized and configured to engage a fuel tank cover in an interference fit. Furthermore, fuel spill trays can be provided with more than, or less than, a pair of arms, with each respective arm having one or more upper seals sized and configured to engage a fuel tank cover in a sealing, interference fit, wherein one or more of the arms may be otherwise configured the same as, similar to, or differently than the first arm 80 or the second arm 82. Also, while the body 60 has been illustrated with one upper annular seal, it will be appreciated that fuel spill trays can be provided with a body having more than one upper annular seal sized and configured to engage a fuel tank cover in a sealing, interference fit, wherein the body can be otherwise configured the same as, similar to, or differently than the body 60.

What is claimed is:

1. A fuel spill tray comprising:
a body defining a generally central aperture and an annular channel, the generally central aperture being configured to receive a neck of a fuel tank; and
a first arm extending outwardly away from the body, wherein the first arm comprises:
a proximal end integral with the body;
a distal end;
a first flange, a second flange laterally spaced from the first flange, and a first web integral with each of the first flange and the second flange, each of the first flange, the second flange, and the first web extending longitudinally from the proximal end to the distal end of the first arm; and
a first upper seal integral with the first flange and a second upper seal laterally spaced from the first upper seal and integral with the second flange, each of the first upper seal and the second upper seal extending longitudinally from the proximal end to the distal end of the first arm.

2. The fuel spill tray of claim 1, further comprising:
a second arm extending outwardly away from the body, wherein the second arm comprises:
a proximal end integral with the body;
a distal end;
a third flange, a fourth flange laterally spaced from the third flange, and a second web integral with each of the third flange and the fourth flange, each of the third flange, the fourth flange, and the second web extending longitudinally from the proximal end to the distal end of the second arm; and
a third upper seal integral with the third flange and a fourth upper seal laterally spaced from the third upper seal and integral with the fourth flange, each of the third upper seal and the fourth upper seal extending longitudinally from the proximal end to the distal end of the second arm.

3. The fuel spill tray of claim 2, further comprising:
a spout extending outwardly away from the body, the spout comprising a proximal end integral with the body and a distal end; wherein
the spout defines a passage and the distal end of the spout defines an outlet opening; and
the passage is in fluid communication with each of the annular channel defined by the body and the outlet opening defined by the distal end of the spout.

4. The fuel spill tray of claim 3, wherein:
the body comprises a disk, an upper, inner annular flange, and an upper, outer annular flange;
the upper, inner annular flange defines the generally central aperture;
the disk comprises an upper surface and a lower surface;
the upper, inner annular flange, the upper, outer annular flange, and the upper surface of the disk cooperate to define the annular channel; and
the upper, outer annular flange defines an inlet opening, the inlet opening being in fluid communication with the annular channel and the passage defined by the spout.

5. The fuel spill tray of claim 4, wherein:
the body further comprises an upper annular seal integral with the upper, outer annular flange.

6. The fuel spill tray of claim 5, wherein:
the body further comprises a lower annular flange integral with and extending away from the lower surface of the disk.

7. The fuel spill tray of claim 2, wherein:
the fuel spill tray is formed from a compound material.

8. The fuel spill tray of claim 7, wherein:
the compound material comprises polyvinyl chloride and nitrile butadiene rubber.

9. The fuel spill tray of claim 2, wherein:
the first and second flanges of the first arm comprise first and second lower surfaces, respectively;
the third and fourth flanges of the second arm comprise third and fourth lower surfaces, respectively; and each of the first lower surface, the second lower surface, the third lower surface, and the fourth lower surface is contoured to complement a shape of an outer surface of a fuel tank.

10. The fuel spill tray of claim 3, wherein:
each of the first arm and the second arm is fluidicly uncoupled from the annular channel defined by the body.

11. A vehicle comprising:
a frame;
a fuel tank supported by the frame, the fuel tank comprising an outer surface and a neck extending away from the outer surface;
a fuel spill tray; and
a fuel tank cover supported by the frame and comprising a lower surface; wherein
the fuel spill tray is interposed between the fuel tank and the fuel tank cover and is in contacting engagement with the outer surface of the fuel tank and with the lower surface of the fuel tank cover, wherein the fuel spill tray comprises:
  a body defining a generally central aperture and an annular channel, the generally central aperture receiving the neck of the fuel tank;
  a first arm extending outwardly away from the body, wherein the first arm comprises:
    a proximal end integral with the body;
    a distal end;
    a first flange, a second flange laterally spaced from the first flange, and a first web integral with each of the first flange and the second flange, wherein each of the first flange, the second flange, and the first web extends longitudinally from the proximal end to the distal end of the first arm;
    a first upper seal integral with the first flange and a second upper seal laterally spaced from the first upper seal and integral with the second flange, each of the first upper seal and the second upper seal extending longitudinally from the proximal end to the distal end of the first arm; and
    each of the first upper seal and the second upper seal is in contacting engagement with the lower surface of the fuel tank cover.

12. The vehicle of claim 11, wherein the fuel spill tray further comprises:
  a second arm extending outwardly away from the body, wherein the second arm comprises:
    a proximal end integral with the body;
    a distal end;
    a third flange, a fourth flange laterally spaced from the third flange, and a second web integral with each of the third flange and the fourth flange, each of the third flange, the fourth flange, and the second web extending longitudinally from the proximal end to the distal end of the second arm;
    a third upper seal integral with the third flange and a fourth upper seal laterally spaced from the third upper seal and integral with the fourth flange, each of the third upper seal and the fourth upper seal extending longitudinally from the proximal end to the distal end of the second arm; and
    each of the third upper seal and the fourth upper seal is in contacting engagement with the lower surface of the fuel tank cover.

13. The vehicle of claim 12, wherein the fuel spill tray further comprises:
a spout extending outwardly away from the body, the spout comprising a proximal end integral with the body and a distal end; wherein
the spout defines a passage and the distal end of the spout defines an outlet opening; and
the passage is in fluid communication with each of the annular channel defined by the body and the outlet opening defined by the distal end of the spout.

14. The vehicle of claim 13, wherein:
the body of the fuel spill tray comprises a disk, an upper, inner annular flange and an upper, outer annular flange;
the disk comprises an upper surface and a lower surface;
the upper, inner annular flange defines the generally central aperture;
the upper, inner annular flange, the upper, outer annular flange, and the upper surface of the disk cooperate to define the annular channel; and
the upper, outer annular flange defines an inlet opening, the inlet opening being in fluid communication with the annular channel and the passage defined by the spout.

15. The vehicle of claim 14, wherein:
the body of the fuel spill tray further comprises an upper annular seal integral with the upper, outer annular flange and in contacting engagement with the lower surface of the fuel tank cover.

16. The vehicle of claim 15, wherein:
the body of the fuel spill tray further comprises a lower annular flange integral with and extending away from the lower surface of the disk, the lower annular flange being in contacting engagement with the outer surface of the fuel tank.

17. The vehicle of claim 12, wherein:
the fuel spill tray is formed from a compound material.

18. The vehicle of claim 17, wherein:
the compound material comprises polyvinyl chloride and nitrite butadiene rubber.

19. The vehicle of claim 12, wherein:
the first flange and the second flange of the first arm of the fuel spill tray comprise first and second lower surfaces, respectively;
the third flange and the fourth flange of the second arm of the fuel spill tray comprise third and fourth lower surfaces, respectively; and
each of the first, second, third, and fourth lower surfaces is contoured to complement a shape of the outer surface of the fuel tank.

20. The vehicle of claim 13, wherein:
each of the first arm and the second arm of the fuel spill tray is fluidicly uncoupled from the annular channel defined by the body of the fuel spill tray.

21. A vehicle comprising:
a frame;
a fuel tank supported by the frame;
a fuel tank cover supported by the frame;
a fuel spill fray interposed between the fuel tank and the fuel tank cover, the fuel spill tray being in contacting engagement with each of the fuel tank and the fuel tank cover; and
an air intake system comprising a snorkel, the snorkel being rearward of the fuel tank;
the fuel spill tray comprises a body and a first arm extending outwardly away from the body; and
the first arm comprises at least one upper seal, the at least one upper seal engaging the fuel tank cover.

22. The vehicle of claim 21, wherein:
the fuel spill tray further comprises a second arm, the second arm comprising at least one upper seal; and the at least one upper seal of the second arm engages the fuel tank cover.

23. The vehicle of claim 22, wherein:

the body of the fuel spill tray comprises an upper annular seal; and the upper annular seal engages the fuel tank cover.

24. The vehicle of claim 23, wherein:

the fuel spill tray further comprises a spout defining a passage;

the body of the fuel spill tray defines a generally central aperture and an annular channel in fluid communication with the passage;

the fuel tank comprises an outer surface and a neck extending away from the outer surface;

the generally central aperture defined by the body receives the neck; and the fuel tank cover comprises a lower surface, each of the at least one upper seal of the first arm, the at least one upper seal of the second arm, and the upper annular seal of the body engaging the lower surface of the fuel tank cover in an interference fit.

25. The vehicle of claim 24, wherein:

the body of the fuel spill tray further comprises a disk comprising a lower surface, the body further comprising a lower annular flange integral with and extending away from the lower surface of the disk, the lower annular flange being in contacting engagement with the outer surface of the fuel tank.

* * * * *

UNITED STATES PATENT AND TRADEMARK OFFICE
CERTIFICATE OF CORRECTION

PATENT NO. : 8,505,592 B2  
APPLICATION NO. : 12/885649  
DATED : August 13, 2013  
INVENTOR(S) : Timothy A. Hahn et al.

Page 1 of 1

It is certified that error appears in the above-identified patent and that said Letters Patent is hereby corrected as shown below:

In the Specifications

Column 2, line 13, change "coyer" to --cover--;  
Column 3, line 10, change "fight" to --right--;  
Column 4, line 11, change "receive, a" to --receive a--;  
Column 4, line 21, change "hot" to --not--;  
Column 6, line 24, change "spin" to --spill--;  
Column 7, line 23, change "of minimizing" to --or minimizing--;  
Column 7, line 46, change "haying" to --having--;

In the Claims

Claim 6, column 8, line 52, change "wherein;" to --wherein:--;  
Claim 18, column 10, line 36, change "nitrite" to --nitrile--; and  
Claim 21, column 10, line 55, change "fray" to --tray--.

Signed and Sealed this  
First Day of October, 2013

Teresa Stanek Rea  
*Deputy Director of the United States Patent and Trademark Office*